: 2,850,400
Patented Sept. 2, 1958

2,850,400

MERCURY CONTAINING COLOR AND PIGMENT PRODUCTION PROCESS

Kenneth E. Long, Cleveland Heights, and Jack R. Lytle, Cleveland, Ohio, assignors to The Harshaw Chemical Company, Cleveland, Ohio, a corporation of Ohio No Drawing. Application April 6, 1956
Serial No. 576,515

9 Claims. (Cl. 106—301)

This invention relates to a process for the manufacture of mercury containing cadmium pigments or colors. More particularly, the invention relates to a process for producing pigments from cadmium sulfide and mercury sulfide, or mixtures and/or solid solutions of cadmium sulfide with other compounds and mercury sulfide.

Red pigments or colors of the cadmium sulfoselenide type have been extensively employed for paint mixtures and other color applications such as for vitreous enamels. These red pigments contain cadmium, sulfur, and selenium, and their color depends upon the method which is used in their manufacture, as well as the variation in composition and ingredients of the final product. In general, they have found wide commercial acceptance because of their superior color retention, tonal and pigment qualities. Recent changes in the market prices of selenium, an essential ingredient of the pigments, have, however, materially reduced the quantities of the pigments sold, the higher prices of the pigments, reflecting the increase in selenium costs, having met with considerable buyer resistance. Consequently there is an immediate need for a cheaper substitute pigment and color having the basic qualities of the cadmium sulfoselenide type.

It is an object of the invention described herein to provide a process for producing mercury modified cadmium sulfide containing pigments. It is further an object to provide a process for producing red pigments having similar quality, tonal and pigment characteristics as to the cadmium sulfoselenide type pigments.

Broadly the process involves the calcination of mercury sulfide, cadmium sulfide and an alkali metal sulfide such as sodium sulfide or sodium polysulfide. The employment of an alkali metal sulfide is deemed essential according to the invention since attempts to develop a red color comparable in quality and tone to the cadmium sulfoselenides by the calcination of a mere physical mixture of cadmium sulfide and mercuric sulfide have met with no success. Apparently, the alkali metal sulfide acts as a catalyst promoting, it is believed, the formation of a solid solution of cadmium and mercury sulfides.

The cadmium sulfide employed in the preparation of the red pigment described herein may be derived from any of the sources conventionally employed in the production of cadmium yellows, and furthermore may be employed alone in the compounding of the red pigment or in admixture or solid solution with other compounds such as barium sulfate, as in the case, for example, with the cadmium lithopones. Thus, cadmium sulfide precipitated from acidic or alkaline solutions with $H_2S$ may be used in the process hereindescribed as well as cadmium sulfide with barium sulfate as produced by co-precipitation. Cadmium lithopones produced by the calcination of a physical mixture of cadmium sulfide and barium sulfate may also be used.

Pretreatment by calcination of the cadmium sulfide is not deemed essential to develop adequate pigment qualities, although this had been originally believed necessary by some individuals. It appears that the pigment qualities are developed adequately by firing to accomplish formation of a solid solution of the mercury sulfide and cadmium sulfide. Thus, it is contemplated that the cadmium sulfide employed as a raw material may or may not be calcined in manners known to the art and generally at temperatures ranging from about 600° C. to 700° C. prior to the use thereof in the subject process.

The mercury sulfide employed may be either black or red mercuric sulfide and is usually incorporated in the mixture in amounts ranging from about .08 to about .3 mol thereof per mol of cadmium sulfide. Greater or lesser amounts thereof may be employed depending upon the severity of the calcination conditions since it will be appreciated by those skilled in the art that mercury sulfide sublimes in appreciable quantities at high temperatures and during lengthy periods under calcination conditions. In general, it has been found under the preferred operating temperatures and by utilization of a lesser amount of mercury sulfide than that mentioned above that there is an apparent predominance of yellow regardless of the length of time to which the mixture is subjected to calcination. As the amount of mercuric sulfide is increased in proportion to the cadmium sulfide, the color of the mixture developed according to the process varies from an orange or reddish orange to a dark maroon with intermediate shades of brilliant red. For the most brilliant shades of red the mercury sulfide is preferably incorporated in the mix in amounts ranging from about .12 to about .2 mol of mercuric sulfide per mol of cadmium sulfide. It will be apparent that the limits set forth are primarily illustrative of ranges wherein normally acceptable color and tonal qualities are developed and that modifying agents in a particular mixture may vary the limits for obtainment of corresponding results.

The alkali metal sulfide such as sodium sulfide or sodium polysulfide appears to act as a catalyst. The amount thereof employed does not appear critical to the obtainment of the final color so long as there is an adequate amount present to catalyze the apparent reaction between the cadmium sulfide and mercury sulfide under the particular conditions of calcination. Generally speaking, lesser quantities are required with higher calcination temperatures. This reaction is believed to be one wherein the cadmium and mercury sulfides form solid solutions, the mercury or the sulfide thereof apparently entering the lattice structure of the cadmium sulfide although we obviously do not wish to be bound by this theoretical explanation. In general, however, the amount of alkali sulfide does influence the rate at which the reaction takes place under any one set of calcination conditions. Thus, it appears that increases in amounts of alkali sulfide per mol of HgS effectively lower the temperature and/or time period at a temperature necessary for obtaining a particular color associated with a particular ratio of cadmium and mercury sulfides. Usually good results have been obtained by employing from about 1.5 mols of sodium sulfide or the equivalent polysulfides to about 3.5 mols thereof per mol of mercuric sulfide. However, 1 mol of sodium sulfide ($Na_2S$) per mol of mercuric sulfide may be employed successfully with high temperatures and as much as 10 mols of sodium sulfide per mol of mercuric sulfide may be utilized.

With regard to the calcination of the ingredients, temperatures in excess of 575° C. should not be employed on a commercial scale since mercuric sulfide tends to sublime, and excessive amounts thereof will become lost from the mixture unless adequate provisions are made for the condensation and return thereof to the mixture. It may be mentioned, however, that reacted cadmium sulfide and mercuric sulfide are somewhat more stable at higher temperatures than a mere physical mixture of the two components. Calcination is preferably conducted at temperatures generally ranging from about 475° C. to about 560° C. in the presence of sodium sulfide or another alkali metal sulfide. It will be found that the desired color is developed at lower temperatures by longer periods of calcination and conversely at the higher temperatures by calcining for shorter periods of time. Although temperatures below 475° C. may be employed for obtaining the desired color, it appears impractical because of longer periods required for calcination. Below about 460° C. it appears as a general rule that no development of color will be successful through the use of practical quantities of catalyst or with practical calcination periods. On the other hand, the upper limit of calcination is for practical purposes limited by the sublimation aspect. Prolonged calcination after the desired color has been developed does not appear to adversely affect the color except through the loss of mercuric sulfide by sublimation. In effect this is about the same as employing lesser amounts of mercury sulfide initially.

The following are specific examples of the process involved:

*Example I*

18.4 grams of a cadmium lithopone analyzing 36.2% cadmium sulfide (CdS) and 62.6% barium sulfate ($BaSO_4$), the balance being normal impurities which had previously been calcined at a temperature of from about 600° C. to 700° C. was mixed with 1.8 grams of black mercuric sulfide (HgS). To this mixture was added 5 milliliters of sodium polysulfide and 5 milliliters of a 10% sodium sulfide ($Na_2S$) solution. The sodium polysulfide solution was prepared by dissolving 2 gram mols of sodium sulfide and .56 gram mol of sulfur in a sodium hydroxide (NaOH) solution so that the mol ratio of $Na_2S$ dissolved to NaOH employed was 2:1. The 5 milliliters of sodium polysulfide solution employed contained an equivalent of .01 gram mol of $Na_2S$, .005 gram mol of NaOH and .0028 gram mol of S.

After thorough mixing to make a thin paste the mass was dried at about 100° C. for 1½ hours and ground to pigment fineness preparatory for calcination. One portion of the mixture was then subjected to a calcination temperature in a covered laboratory crucible of 500° C. for ten minutes and thereafter air cooled in the covered crucible. The color of this portion was brown. Another portion of the mixture was simultaneously subjected to the same calcination temperature (500° C.) for a period of twenty minutes. The calcined material of this latter portion, after identical cooling, had a bright red color with a thin top surface layer having a dull brown color. It is apparent from these examples that an adequate time at a particular temperature must be permitted for the development of the desired color.

*Example II*

Five samples were prepared from cadmium lithopone having the same analysis and precalcination treatment as mentioned in Example I. Each sample contained 18.4 grams of the lithopone, 1.8 grams of black mercuric sulfide and was subjected to a calcination temperature of 500° C. for fifteen minutes. The method of preparing the samples was substantially identical to the procedure set forth in Example I. The catalyst in this example was sodium sulfide, varying quantities being employed in the respective samples as follows:

| Sample No. | Sodium sulfide | | Mol ratio, $Na_2S/HgS$ | Color |
|---|---|---|---|---|
| | Ml. of 10% solution | Mols | | |
| 190 | 5 | .00644 | .828 | Brown. |
| 191 | 10 | .0128 | 1.66 | Brownish red. |
| 192 | 20 | .0256 | 3.32 | Reddish brown. |
| 193 | 30 | .0384 | 4.98 | Dark red. |
| 194 | 50 | .064 | 8.28 | Red. |

Whereas the previous example illustrated the fact that there is a time temperature relationship for producing an acceptable color for a particular amount of catalyst, the instant example illustrates the fact that the amount of catalyst may be increased to accelerate the attainment of a particular color under a particular calcination condition.

*Example III*

Five samples were prepared from cadmium lithopone having the same analysis and preparation treatment as mentioned in Example I. Each sample was prepared in substantially the same manner as set forth in Example I except for the hereinafter mentioned modifications relating to ingredients, quantities thereof and calcination conditions. Each sample contained 18.4 grams of cadmium lithopone, 5 milliliters of a 10% sodium sulfide solution and 5 milliliters of a sodium polysulfide solution prepared as mentioned in Example I. The 5 milliliters of polysulfide contained an equivalent of .01 gram mol of $Na_2S$, .005 gram mol of NaOH and .0028 gram mol of S. The samples were subjected to calcination for fifteen minutes at 550° C. The amount of mercuric sulfide employed and color produced varied as follows:

| Sample No. | Mercury sulfide, gram mols | Mol ratio, HgS/CdS | Color |
|---|---|---|---|
| 200 | .00429 | .093 | Reddish orange. |
| 201 | .00773 | .1675 | Brilliant red. |
| 202 | .0107 | .232 | Dark red. |
| 203 | .0150 | .325 | Maroon. |
| 204 | .0215 | .467 | Brownish black. |

The above example illustrates the variation in color according to the variation in quantity of mercuric sulfide employed.

*Example IV*

18.4 grams of an uncalcined co-precipitated mixture of cadmium sulfide and barium sulfate having 62.6% barium sulfate ($BaSO_4$) and 36.2% cadmium sulfide, therein, with the balance being normal impurities, was mixed with 1.8 grams of mercuric sulfide amounting to .00773 gram mol thereof. To this mixture was added 5 ml. of a 10% sodium sulfide solution and 5 ml. of sodium polysulfide as prepared in Example I. The 5 milliliters of sodium polysulfide solution contained an equivalent of .01 gram mol of $Na_2S$, .005 gram mol of NaOH and .0028 gram mol of S. After thorough mixing the thin paste obtained was dried at 100° C. for 1½ hours and ground to pigment fineness preparatory for calcination. Thereafter the mixture was calcined at 550° C. for fifteen minutes. A brilliant red color was produced.

*Example V*

9.2 grams of uncalcined cadmium sulfide was mixed with 1.8 grams of mercuric sulfide, 2.5 milliliters of sodium sulfide and 2.5 milliliters of sodium polysulfide produced according to the method set forth in Example I. The method employed for the preparation of the color was substantially identical to the procedure set forth heretofore. The mixed and dried quantities were calcined at 550° C. for fifteen minutes and a brilliant red color resulted.

Other alkali metal sulfides, such as potassium sulfide, may be substituted in the above examples for sodium sulfide.

It is apparent that a new process of producing mercury modified cadmium sulfide has been devised based upon the use of a catalyst for promoting the obtainment of the color.

We claim:

1. The method of preparing a red pigment comprising admixing cadmium sulfide, mercury sulfide and an alkali metal sulfide and thereafter calcining said admixture in a temperature range from about 460° C. to about 575° C., said cadmium sulfide and mercury sulfide being admixed in amounts from about .08 to about .3 mol of mercury sulfide per mol of cadmium sulfide and said alkali metal sulfide being admixed in an amount from about 1 to about 10 mols of alkali metal sulfide per mol of mercury sulfide.

2. The method according to claim 1, wherein said alkali metal sulfide is selected from the group consisting of sodium sulfide and sodium polysulfide.

3. The method of preparing a red pigment comprising admixing cadmium lithopone, mercuric sulfide and an alkali metal sulfide selected from the group consisting of sodium sulfide and sodium polysulfide, said mercuric sulfide being admixed in an amount from about .08 to about .3 mol of mercuric sulfide per mol of cadmium sulfide in said lithopone and said alkali metal sulfide being admixed in amounts ranging from about 1 to about 10 mols thereof per mol of mercuric sulfide and thereafter calcining the same in the range from about 460° C. to about 575° C.

4. The method according to claim 3 wherein said calcination is carried out at a temperature ranging from about 475° C. to about 560° C.

5. The method of preparing a red pigment comprising admixing cadmium lithopone, mercuric sulfide and an alkali metal sulfide selected from the group consisting of sodium sulfide and sodium polysulfide, said mercuric sulfide being admixed in amounts ranging from .12 to about .2 mol of mercuric sulfide per mol of cadmium sulfide in said lithopone and said alkali metal sulfide being admixed in amounts ranging from 1.5 to about 3.5 mols thereof per mol of mercuric sulfide and thereafter calcining same in the range from about 460° C. to about 575° C.

6. The method according to claim 5, wherein said calcination is carried out at a temperature ranging from about 475° C. to about 560° C.

7. A red pigment comprising calcined mercury sulfide and cadmium sulfide the same having been calcined together in the presence of an alkali metal sulfide at a temperature from about 460° C. to about 575° C., the mercury sulfide and cadmium sulfide being present in proportions from about 0.08 to about 0.3 mol of mercury sulfide per mol of cadmium sulfide and the proportions of alkali metal sulfide being from about 1.0 mol to about 10 mols per mol of mercury sulfide.

8. A red pigment comprising calcined mercury sulfide and cadmium sulfide in mol proportions of mercury sulfide to cadmium sulfide of from about .08 to about 0.3 the same having been calcined together in the presence of an alkali metal sulfide in a temperature range from about 460° S. to about 575° C., said alkali metal sulfide being present in proportion from about 1.5 to about 3.5 mols per mol of mercury sulfide.

9. A pigment according to claim 8 wherein said alkali metal sulfide is selected from the group consisting of sodium sulfide and sodium polysulfide.

References Cited in the file of this patent

UNITED STATES PATENTS 2,605,167   O'Brien _____ July 29, 1952

FOREIGN PATENTS 402,358   Great Britain _____ Nov. 30, 1933

OTHER REFERENCES

"Physical Chemistry," vol. 47, year 1943, pages 537–543 inclusive.

Pages 18 and 19 of vol. II of Mattiello's "Protective and Decorative Coatings," published by John Wiley & Sons, Inc., New York, N. Y.